(12) United States Patent
Yoo et al.

(10) Patent No.: US 11,383,666 B2
(45) Date of Patent: Jul. 12, 2022

(54) SIDE AIRBAG FOR VEHICLE

(71) Applicants: HYUNDAI MOTOR COMPANY, Seoul (KR); KIA MOTORS CORPORATION, Seoul (KR)

(72) Inventors: Joo Seon Yoo, Incheon (KR); Hyock In Kwon, Seongnam-si (KR); Hyo Shub Shin, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 118 days.

(21) Appl. No.: 16/992,322

(22) Filed: Aug. 13, 2020

(65) Prior Publication Data

US 2021/0122318 A1 Apr. 29, 2021

(30) Foreign Application Priority Data

Oct. 23, 2019 (KR) ........................ 10-2019-0131817

(51) Int. Cl.
*B60R 21/207* (2006.01)
*B60R 21/276* (2006.01)
(Continued)

(52) U.S. Cl.
CPC .......... *B60R 21/207* (2013.01); *B60R 21/233* (2013.01); *B60R 21/239* (2013.01); *B60R 21/23138* (2013.01); *B60R 21/276* (2013.01); *B60R 21/2338* (2013.01); *B60R 2021/0044* (2013.01); *B60R 2021/0055* (2013.01);
(Continued)

(58) Field of Classification Search
CPC ............ B60R 21/207; B60R 21/23138; B60R 21/233; B60R 21/239; B60R 21/276; B60R 21/2338; B60R 2021/0044; B60R 2021/0055; B60R 2021/161; B60R 2021/23146; B60R 2021/23382; B60R 2021/2395; B60R 2021/23384; B60R 21/231; B60R 21/26; B60R 2021/21652
See application file for complete search history.

(56) References Cited

U.S. PATENT DOCUMENTS 5,556,128 A * 9/1996 Sinnhuber ......... B60R 21/23138
280/739
5,756,863 A 5/1998 Murayama et al.
(Continued)

FOREIGN PATENT DOCUMENTS

CN 112026704 A * 12/2020 ........... B60R 21/207
JP 2013-126827 A 6/2013
(Continued)

*Primary Examiner* — Karen Beck
(74) *Attorney, Agent, or Firm* — Morgan, Lewis & Bockius LLP

(57) ABSTRACT

A side airbag (SAB) of a vehicle includes: a main chamber disposed in a seat to be deployed from a side surface portion of the seat and, when deployed, configured to cover at least one of a thoracic region, an abdomen region, or a pelvis region of an occupant; a main inflator configured to supply gas to the main chamber to deploy the main chamber; and an auxiliary chamber communicating with the main chamber to allow the gas inside the main chamber to be supplied to an interior of the auxiliary chamber and connected to the main chamber to be deploy above the main chamber.

13 Claims, 14 Drawing Sheets

(51) Int. Cl.
  *B60R 21/239* (2006.01)
  *B60R 21/231* (2011.01)
  *B60R 21/233* (2006.01)
  *B60R 21/2338* (2011.01)
  *B60R 21/00* (2006.01)
  *B60R 21/16* (2006.01)

(52) U.S. Cl.
  CPC .................. *B60R 2021/161* (2013.01); *B60R 2021/23146* (2013.01); *B60R 2021/23382* (2013.01)

(56) References Cited

U.S. PATENT DOCUMENTS

| | | | | |
|---|---|---|---|---|
| 7,059,634 | B2* | 6/2006 | Bossecker | B60R 21/239 |
| | | | | 280/739 |
| 7,798,520 | B2* | 9/2010 | Feller | B60R 21/23138 |
| | | | | 280/730.2 |
| 9,139,153 | B2* | 9/2015 | Deng | B60R 21/21 |
| 9,682,681 | B1* | 6/2017 | Patel | B60R 21/23138 |
| 10,486,638 | B2* | 11/2019 | Kwon | B60R 21/23138 |
| 10,543,800 | B2* | 1/2020 | Kwon | B60R 21/207 |
| 10,696,265 | B2* | 6/2020 | Shin | B60R 21/232 |
| 11,059,442 | B2* | 7/2021 | Adler | B60R 21/23138 |
| 11,091,111 | B2* | 8/2021 | Deng | B60R 21/013 |
| 2005/0173900 | A1* | 8/2005 | Zhao | B60R 21/23138 |
| | | | | 280/730.2 |
| 2009/0160166 | A1* | 6/2009 | Kataoka | B60R 21/207 |
| | | | | 280/730.2 |
| 2016/0075303 | A1* | 3/2016 | Iida | B60R 21/2338 |
| | | | | 280/729 |
| 2018/0118150 | A1* | 5/2018 | Kwon | B60R 21/207 |
| 2019/0054890 | A1* | 2/2019 | Kwon | B60R 21/233 |
| 2019/0061675 | A1* | 2/2019 | Kwon | B60R 21/261 |
| 2019/0092271 | A1* | 3/2019 | Park | B60R 21/2338 |
| 2019/0106076 | A1* | 4/2019 | Shin | B60R 21/23138 |
| 2019/0111880 | A1* | 4/2019 | Choi | B60R 21/01552 |
| 2019/0118759 | A1* | 4/2019 | Kobayashi | B60R 21/23138 |
| 2019/0176744 | A1 | 6/2019 | Yoo et al. | |
| 2019/0283700 | A1* | 9/2019 | Kwon | B60R 21/23138 |
| 2019/0381968 | A1* | 12/2019 | Kwon | B60N 2/04 |
| 2020/0114855 | A1* | 4/2020 | Deng | B60R 21/207 |
| 2020/0353885 | A1* | 11/2020 | Kim | B60R 21/01554 |
| 2020/0384941 | A1* | 12/2020 | Kwon | B60R 21/207 |

FOREIGN PATENT DOCUMENTS

| | | | |
|---|---|---|---|
| JP | 2019-137302 A | 8/2019 | |
| KR | 10-2014-0132188 A | 11/2014 | |
| WO | WO-2020080374 A1 * | 4/2020 | ............ B60R 21/01 |

* cited by examiner

-PRIOR ART-

[FIG. 6]
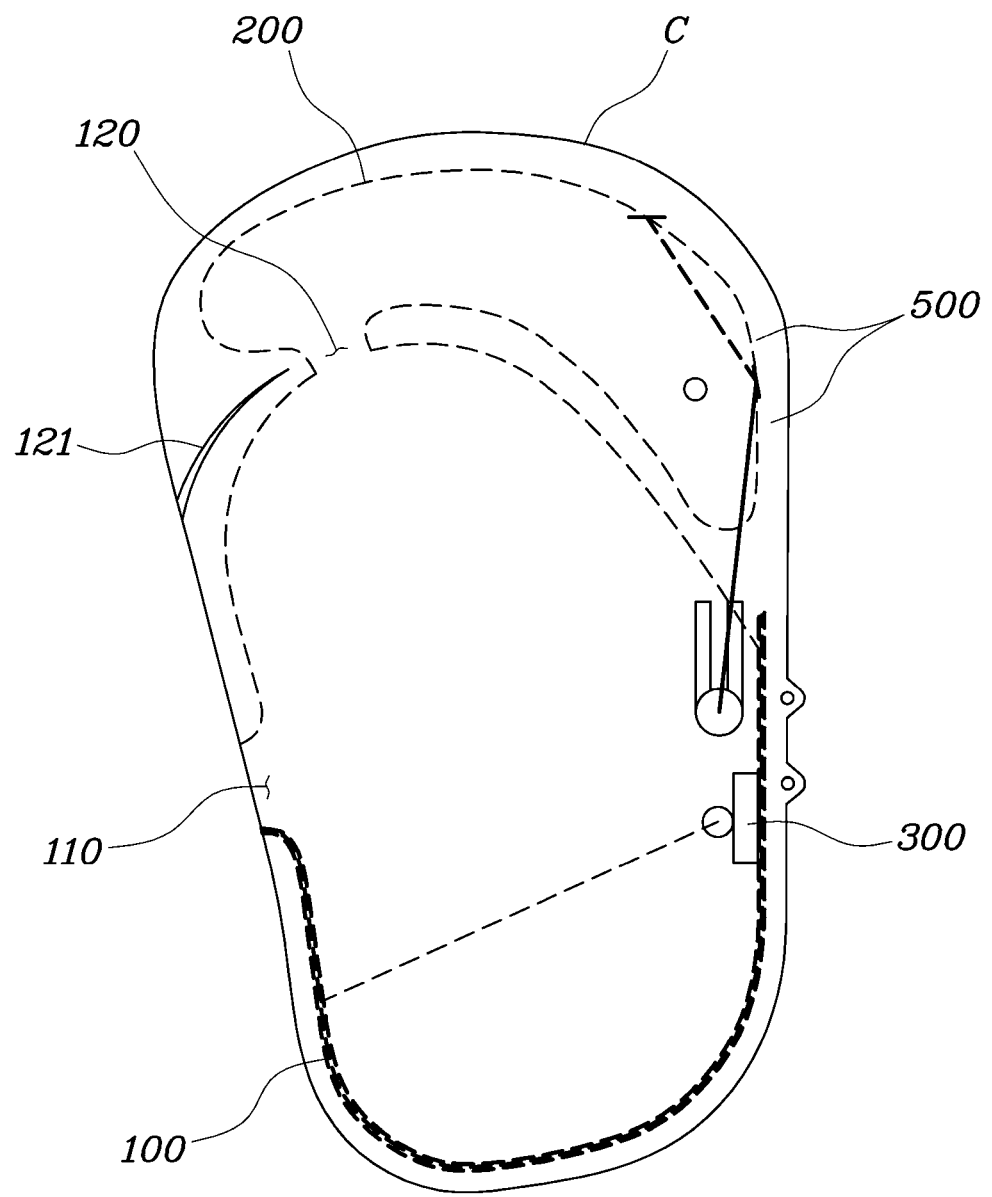

[FIG. 7]
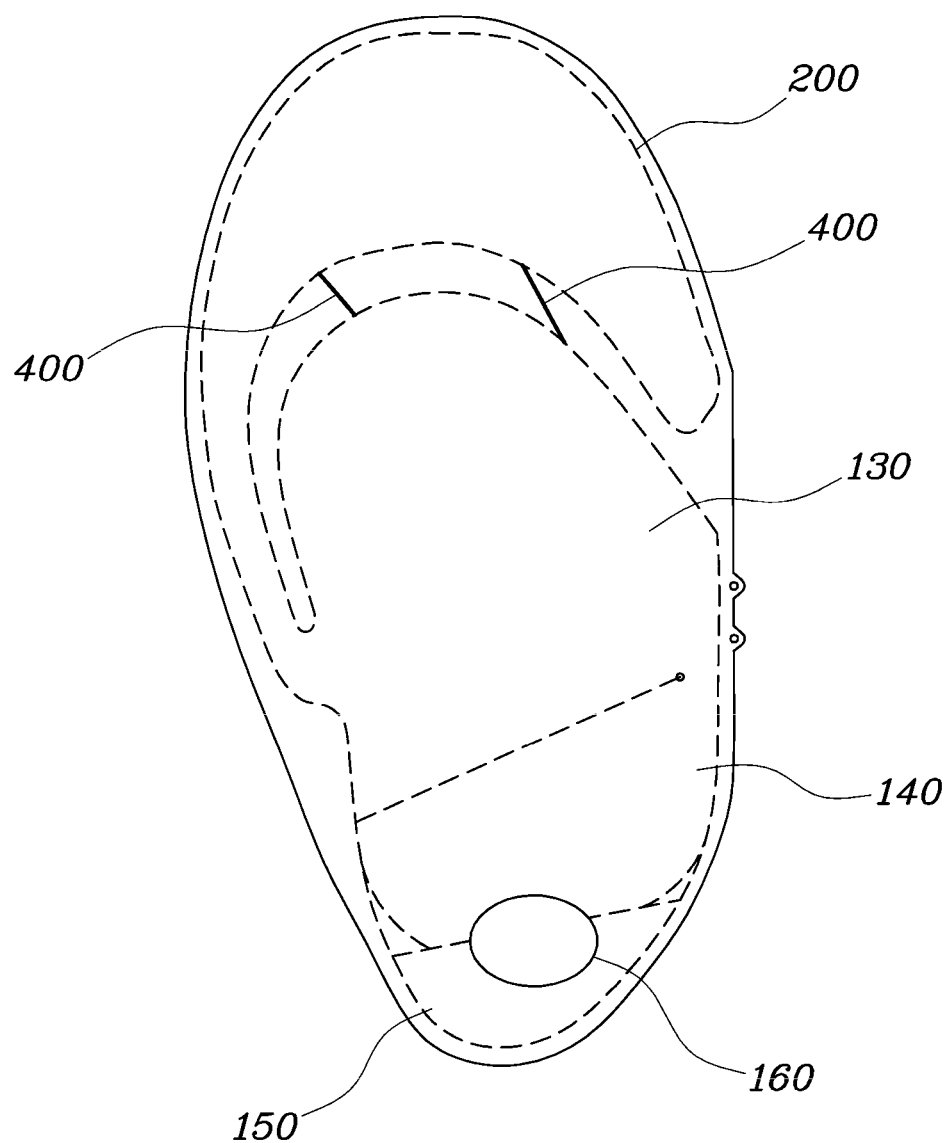

[FIG. 8A]
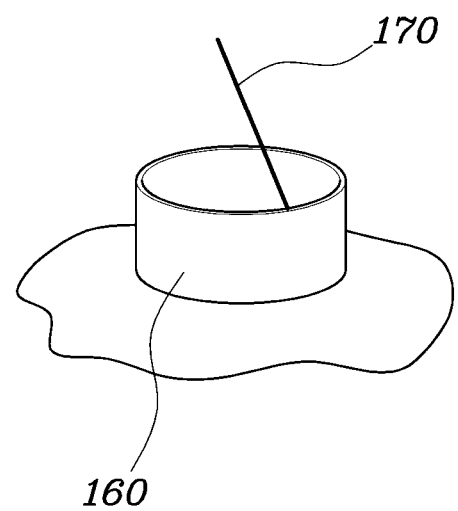

[FIG. 8B]
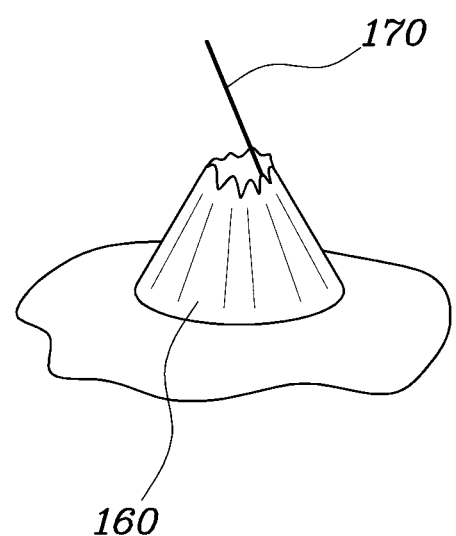

[FIG. 9]
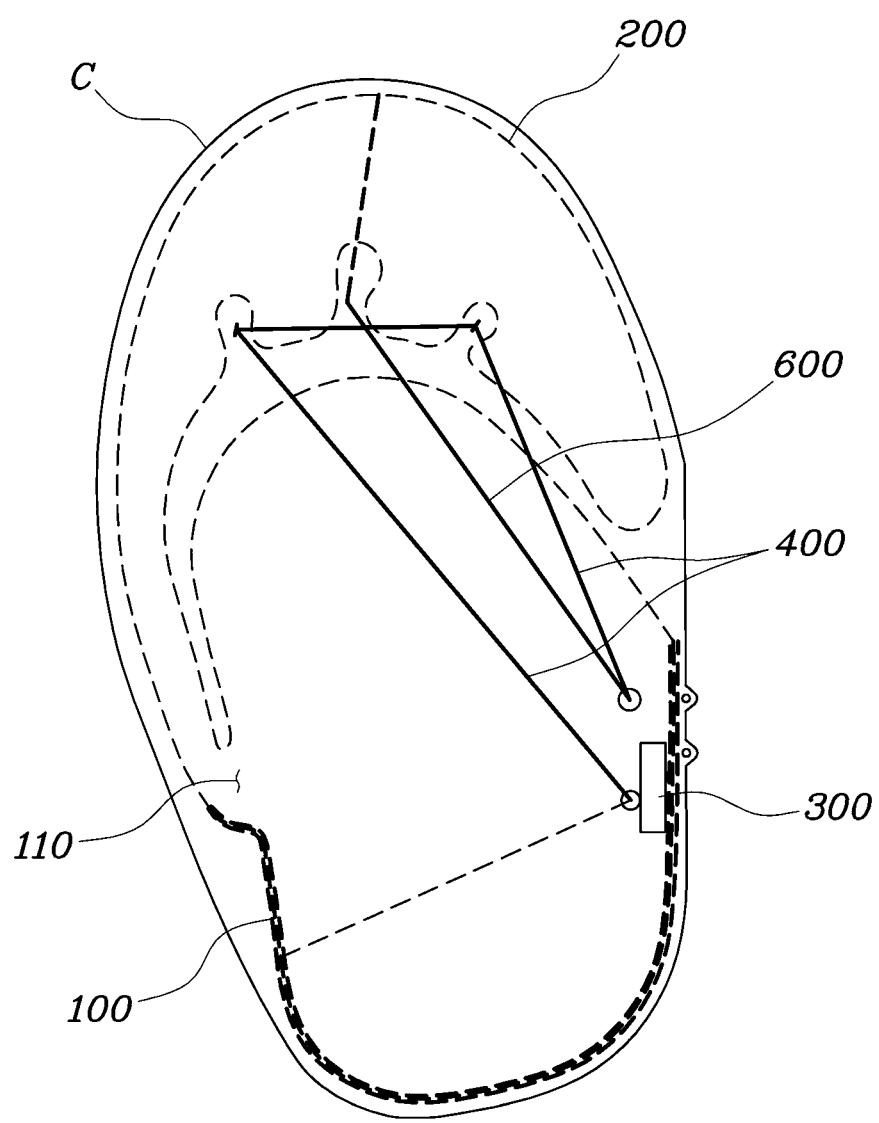

[FIG. 10]
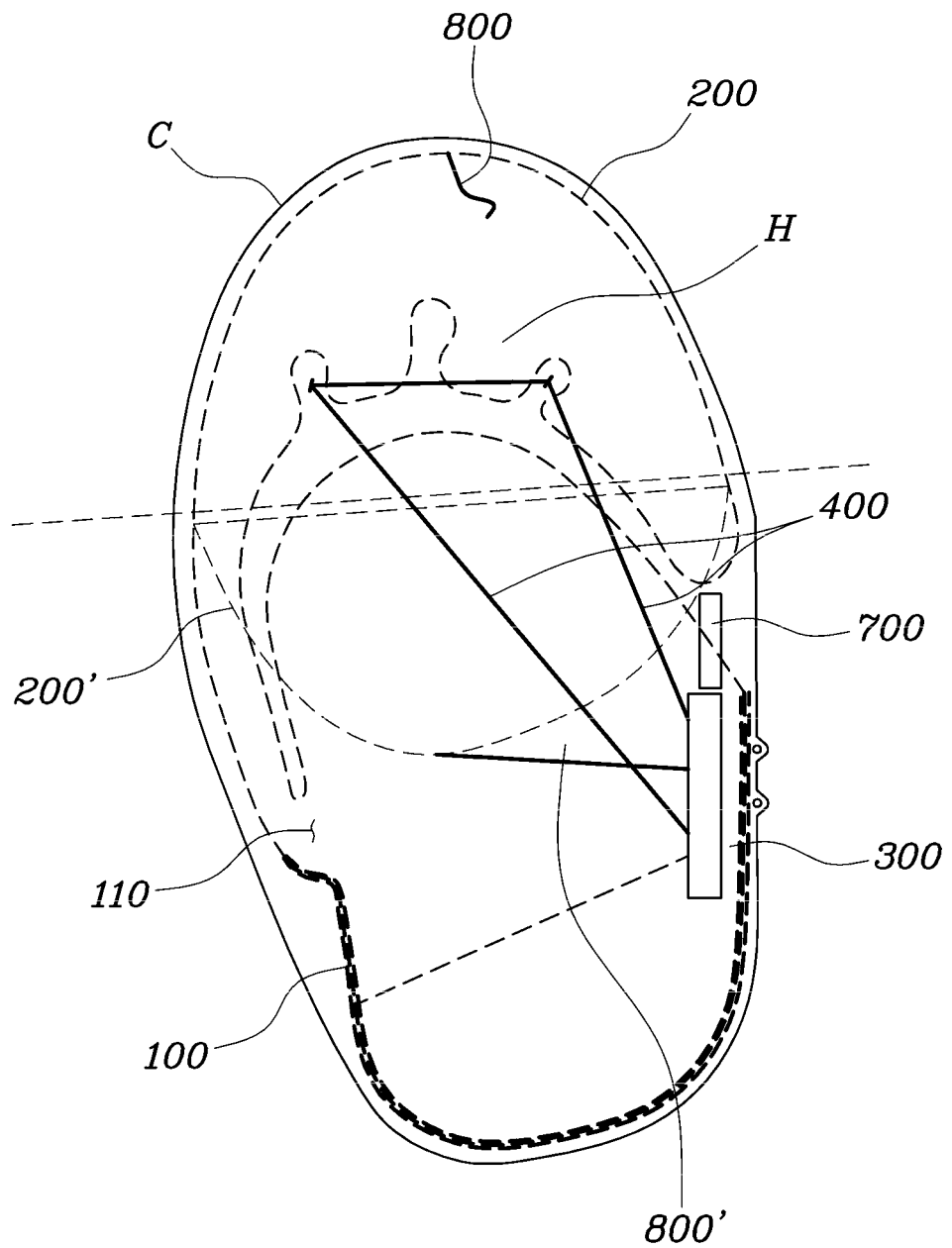

[FIG.11A]
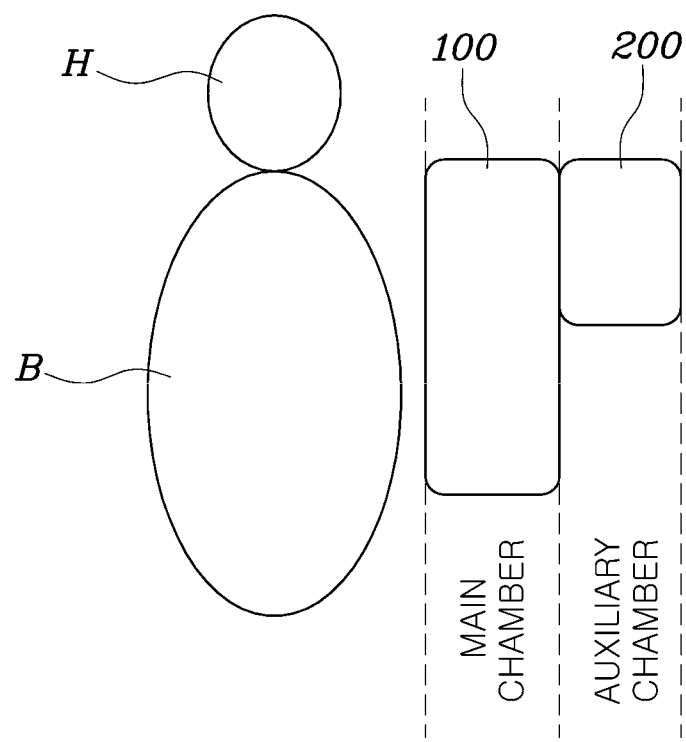

[FIG. 11B]
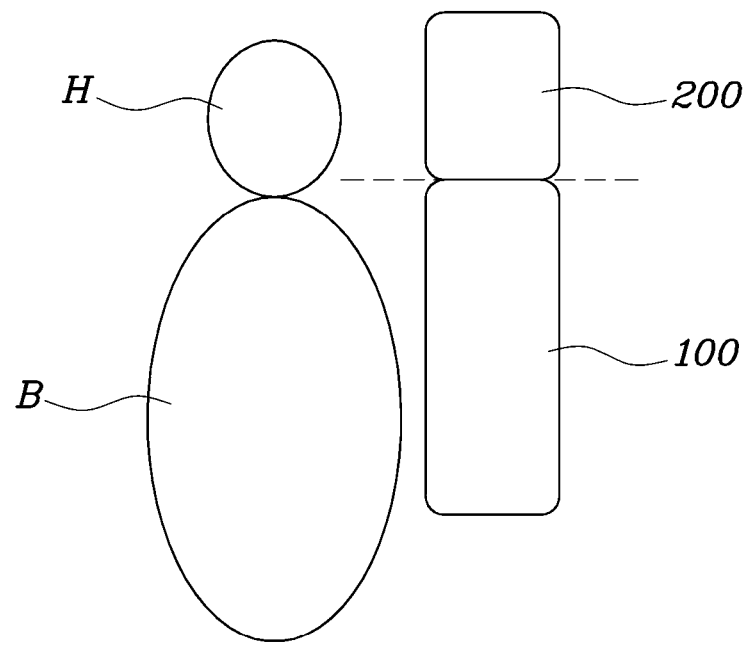

[FIG. 12]
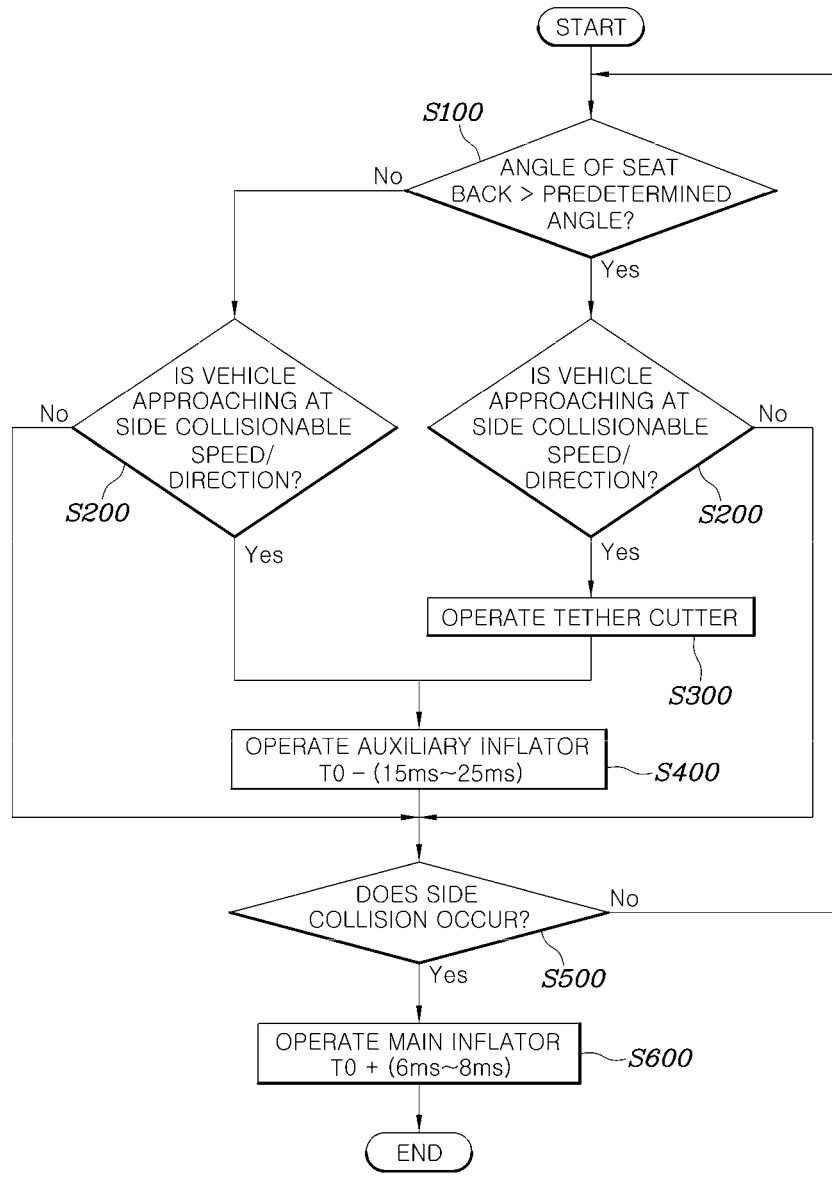

SIDE AIRBAG FOR VEHICLE

CROSS REFERENCE TO RELATED APPLICATION

The present application claims priority of Korean Patent Application No. 10-2019-0131817 filed on Oct. 23, 2019 in the Korean Intellectual Property Office, the entire contents of which is incorporated herein for all purposes by this reference.

TECHNICAL FIELD

The present disclosure relates to a side airbag (SAB) for a vehicle, which is applicable to an autonomous vehicle and is capable of effectively protecting an occupant in response to various angles of a seat.

BACKGROUND

With the recent development of autonomous vehicles, interior spaces of vehicles are also expected to undergo many changes. As autonomous driving is possible, the most anticipated change is a vehicle seat in the interior space of the vehicle.

The existing seat is mainly capable of performing passive movement, such as height movement, in a fixed attitude facing a front side of the vehicle. However, as autonomous driving is possible, a driver is freed from driving, and thus the driver can maintain in a relaxing posture while driving the vehicle.

However, since an airbag is designed on the basis of a normal posture in a conventional vehicle, when a collision occurs in the relaxing posture, a location of a major injury position of the occupant is shifted. Thus, the existing airbag cannot effectively protect the occupant in the event of an accident.

In particular, there are problems that a side airbag (SAB) for protecting an occupant's side in a relaxing posture of an occupant does not have a sufficient pelvic protection area, and a curtain airbag (CAB) for protecting the occupant between the occupant and a window does not have a sufficient head protection area of the occupant.

The foregoing is intended merely to aid in the understanding of the background of the present disclosure, and is not intended to mean that the present disclosure falls within the purview of the related art that is already known to those skilled in the art.

SUMMARY

The present disclosure has been made keeping in mind the above problems occurring in the related art, and the present disclosure is intended to propose a side airbag (SAB) capable of safely protecting an occupant even when the occupant is in a relaxing posture.

According to one aspect of the present disclosure, there is provided a SAB of a vehicle, which includes: a main chamber disposed in a seat to be deployed from a side surface portion of the seat and, when deployed, configured to cover at least one of a thoracic region, an abdomen region, or a pelvis region of an occupant; a main inflator configured to supply gas to the main chamber to deploy the main chamber; and an auxiliary chamber communicating with the main chamber to allow the gas inside the main chamber to be supplied to an interior of the auxiliary chamber and connected to the main chamber to be deployed above the main chamber.

The auxiliary chamber may communicate with the main chamber through an internal vent hole formed at a position spaced apart from a position, at which the gas is supplied from the main inflator, in a front-rear direction and may be deployed with a delay than the deployment of the main chamber.

The auxiliary chamber may communicate with the main chamber through an internal vent hole located at a front side or a rear side of the main chamber, and the SAB may further include a fixing tether coupled to the auxiliary chamber at a position spaced apart from an internal vent hole in a front-rear direction and configured to pull the auxiliary chamber to the occupant when the auxiliary chamber is deployed.

Both end portions of the fixing tether may be fixed to the seat, and the fixing tether may be coupled to the auxiliary chamber at a plurality of positions spaced apart from each other between the both end portions in the front-rear direction.

A bending line may be formed to vertically extend in a central portion of the auxiliary chamber and may bend the auxiliary chamber to be pursed to the occupant when the auxiliary chamber is deployed.

The auxiliary chamber may be coupled to an upper portion of the main chamber to communicate therewith through an internal passage formed in the upper portion of the main chamber.

The SAB may further include an external tether connected to the auxiliary chamber at a position spaced apart from the internal passage in the front-rear direction and configured to pull the auxiliary chamber downward when the auxiliary chamber is deployed.

The internal passage configured to connect the main chamber to the auxiliary chamber may be formed in a central portion between the auxiliary chamber and the main chamber, and a slit may be formed to extend to the internal passage to separate the main chamber from the auxiliary chamber in front of the main chamber and auxiliary chamber.

The main chamber may include a thoracic chamber located in an upper portion of the main chamber and configured to cover the thoracic region and the abdomen region of the occupant; and a pelvic chamber located in a lower portion of the main chamber and configured to cover the pelvis region of the occupant, and the thoracic chamber and the pelvic chamber may communicate with the main inflator.

The SAB may further include an augmentation chamber coupled to the pelvic chamber to communicate therewith through a variable vent and located below the pelvic chamber when the SAB is deployed, and the variable vent may communicate to allow gas inside the pelvic chamber to be supplied to the augmentation chamber when the variable vent opened.

The SAB may further include a vent tether connected to the variable vent and configured to, when the pelvic chamber is deployed, close the variable vent as being pulled or open the variable vent as being cut.

The SAB may further include a central tether coupled to the upper portion of the auxiliary chamber and configured to pull the upper portion of the auxiliary chamber to the occupant when the auxiliary chamber is deployed.

The SAB may further include an auxiliary inflator configured to supply gas to the auxiliary chamber to deploy the auxiliary chamber.

The SAB may further include a limiting tether coupled to the upper portion of the auxiliary chamber and configured to pull the upper portion of the auxiliary chamber downward so as to limit deployment of the auxiliary chamber above the main chamber; and a tether cutter configured to cut the limiting tether during an operation of the SAB.

The SAB may further include a controller configured to control the auxiliary inflator to supply gas to the auxiliary chamber when a side collision of a vehicle is expected and control the main inflator to supply gas to the main chamber when the side collision of the vehicle occurs.

The SAB may further include a controller configured to operate the tether cutter to cut the limiting tether when the auxiliary inflator supplies gas to the auxiliary chamber and an reclining angle of the seat is greater than or equal to a predetermined angle.

BRIEF DESCRIPTION OF THE DRAWINGS

The above and other objects, features and other advantages of the present disclosure will be more clearly understood from the following detailed description when taken in conjunction with the accompanying drawings, in which:

FIG. 6 is a cross-sectional view illustrating a state in which a SAB is deployed according to another exemplary embodiment of the present disclosure;

FIG. 7 is a cross-sectional view illustrating a state in which a SAB is deployed according to still another exemplary embodiment of the present disclosure;

FIGS. 8A and 8B are diagrams illustrating a variable vent according to an exemplary embodiment of the present disclosure;

FIG. 9 is a cross-sectional view illustrating a state in which a SAB is deployed according to yet another exemplary embodiment of the present disclosure;

FIG. 10 is a cross-sectional view illustrating a state in which a SAB is deployed according to still yet another exemplary embodiment of the present disclosure;

FIGS. 11A and 11B are diagrams illustrating deployment states of a main chamber and an auxiliary chamber according to whether a limiting tether is cut; and FIG. 12 is a flowchart of a controller (not shown) according to an exemplary embodiment of the present disclosure.

DETAILED DESCRIPTION

Figure 1:
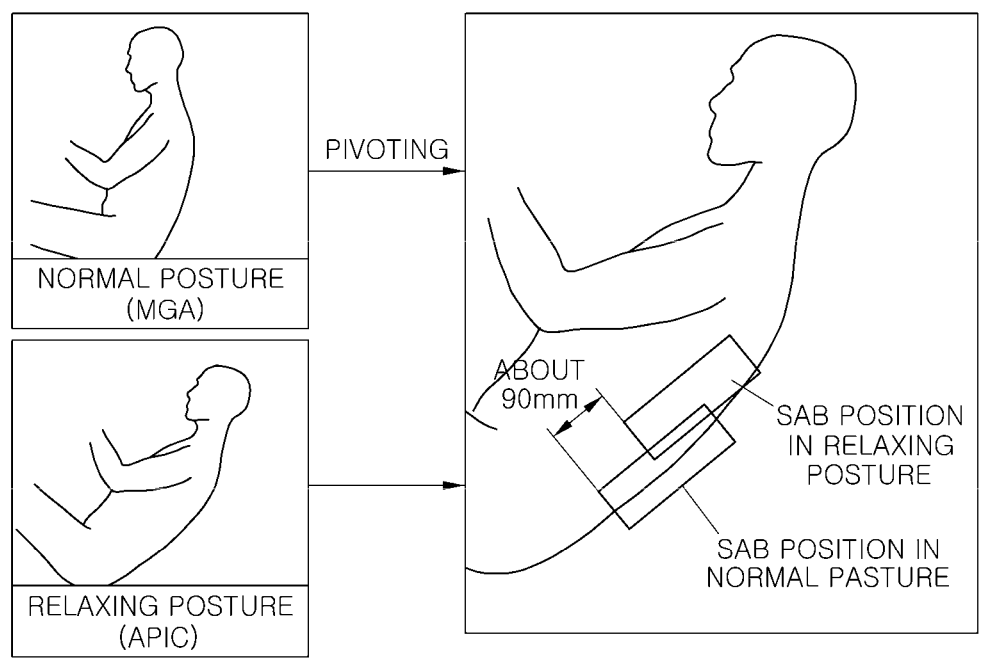
FIGS. 1 and 2 are diagrams illustrating a position and a deployment shape of a side airbag (SAB) of a vehicle according to the related art.

Specific structural and functional descriptions of the embodiments of the present disclosure disclosed in this disclosure or application are illustrative only for the purpose of describing the embodiments, and the embodiments according to the present disclosure may be implemented in various forms and should not be construed as being limited to embodiments described in this disclosure or application.

The exemplary embodiments according to the present disclosure may be variously modified and may have various forms so that specific embodiments will be illustrated in the drawings and be described in detail in this disclosure or application. It should be understood, however, that it is not intended to limit the embodiments according to the concept of the present disclosure to specific disclosure forms, but it includes all modifications, equivalents, and alternatives falling within the spirit and scope of the present disclosure.

The terms first, second, and/or the like may be used to describe various components, but the components should not be limited by these terms. These terms may be used only for the purpose of distinguishing one component from another component, and, for example, a first component may be referred to as a second element, and similarly, the second component may also be referred to as the first component without departing from the scope of the present disclosure.

When a component is referred to as being "connected," or "coupled" to another component, it may be directly connected or coupled to another component, but it should be understood that yet another component may exist between the component and another component. Contrarily, when a component is referred to as being "directly connected," or "directly coupled" to another, it should be understood that still another component may be absent between the component and another component. Other expressions describing the relationship between components, that is, "between" and "immediately between," or "adjacent to" and "directly adjacent to" should also be construed as described above.

Terms used herein is used only for the purpose of describing specific embodiments, and are not intended to limit the present disclosure. Unless the context clearly dictates otherwise, the singular form includes the plural form. In this disclosure, the terms "comprising," "having," or the like are used to specify that a feature, a number, a step, an operation, a component, an element, or a combination thereof described herein exists, and they do not preclude the presence or addition of one or more other features, numbers, steps, operations, components, elements, or combinations thereof.

Unless defined otherwise, all terms including technical or scientific terms used herein have the same meaning as commonly understood by those skill in the art to which the present disclosure pertains. General terms that are defined in a dictionary shall be construed to have meanings that are consistent in the context of the relevant art, and will not be interpreted as having an idealistic or excessively formalistic meaning unless clearly defined in this disclosure.

Hereinafter, exemplary embodiments of the present disclosure will be described in detail with reference to the accompanying drawings. Like reference numerals denote like components throughout the drawings.

Figure 2:
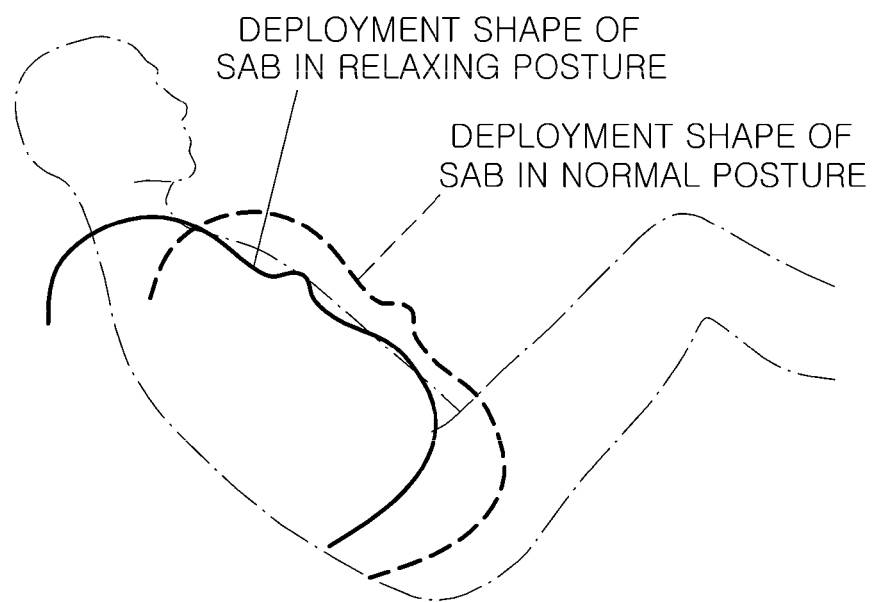

FIGS. 1 and 2 are diagrams illustrating a position and a deployment shape of a side airbag (SAB) of a vehicle according to the related art.

Referring to FIGS. 1 and 2, as an autonomous vehicle is developed, an occupant including a driver may take a relaxing posture during driving. Here, the relaxing posture refers to a posture in which a reclining angle of a seat is inclined over a predetermined angle and a posture in which the occupant lies on the seat.

In a SAB of a vehicle according to the related art, since a reclining angle of the seat is varied as an occupant is spaced apart from a pivoting shaft of a seat, there is a problem that a relative position between the SAB and the occupant is varied. In particular, there is a problem that, as the occupant descends relative to the seat, the SAB does not sufficiently protect a pelvic region of the occupant.

Further, there is a problem that a curtain airbag (CAB) deployed from a pillar side of the vehicle cannot sufficiently protect a head of the occupant relatively descending from the relaxing posture of the occupant.

When the CAB extends to protect the head of the occupant so as to solve the above problems, a package size of the CAB is increased, and thus there is a problem that a deployment speed of the CAB is delayed as well as it is difficult to early hold the head of the occupant. Further, when an occupant seat slides in a front-rear direction, there is a problem that it is difficult to cope with the sliding. Therefore, expansion of the SAB is the most efficient method.

Figure 3:
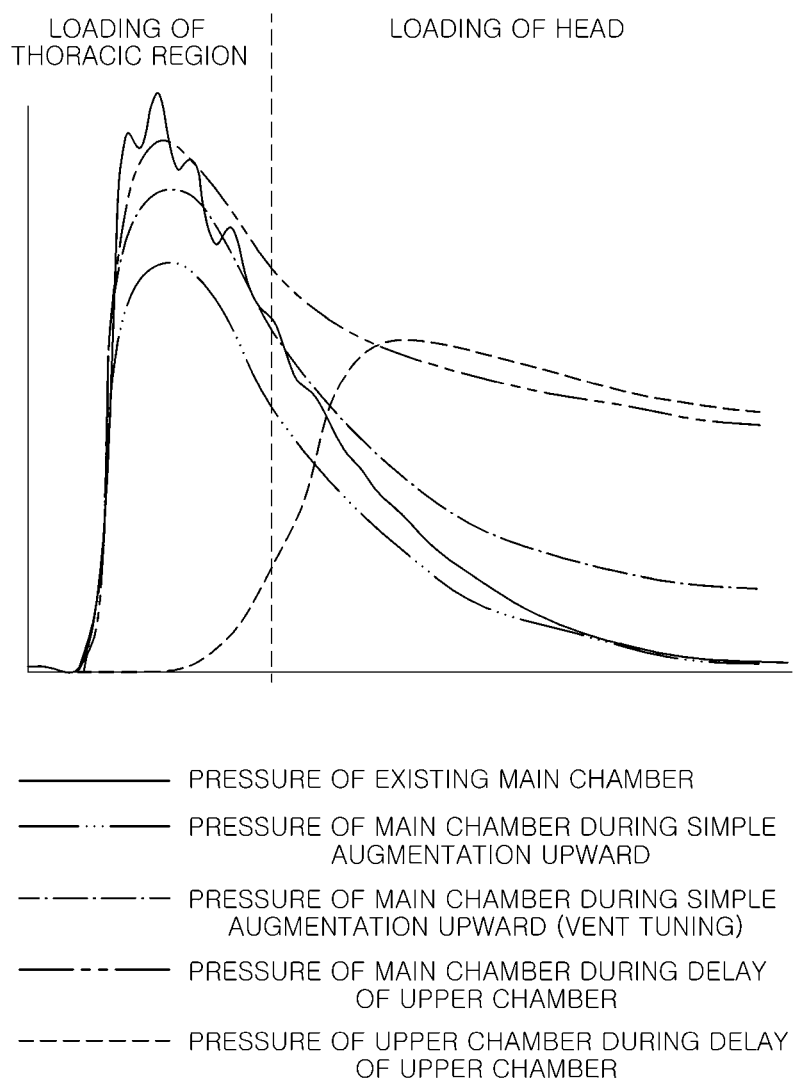
FIG. 3 is a graph showing variations in pressure of chambers according to the related art and an exemplary embodiment of the present disclosure.

FIG. 3 is a graph showing variations in pressure of chambers according to the related art and an exemplary embodiment of the present disclosure.

Referring to FIG. 3, the existing main chamber according to the related art can protect only a thoracic region of the occupant while the thoracic region thereof is loaded. However, when the head of the occupant is loaded after the loading of the thoracic region, there is a problem that the head of the occupant cannot be covered.

In order to solve the above problem, when the same main chamber is simply augmented upward so as to cover the head of the occupant, there is a problem that an overall pressure in the main chamber is reduced, and thus it is insufficient to protect the thoracic region. Even when the overall pressure of the main chamber is increased by tuning a vent, there is a problem that it is difficult to maintain a pressure while the head of the occupant is loaded. That is, since a time delay occurs between the loadings of the thoracic region and the head of the occupant, it is difficult to simultaneously satisfy the pressure inside the chamber.

Accordingly, when an upper chamber is separately formed from the main chamber and deployed such that development and a time delay of the main chamber occur, pressures of the main chamber and the upper chamber may be simultaneously satisfied during a time when the loadings of the thoracic region and the head of the occupant occur.

Figure 4:
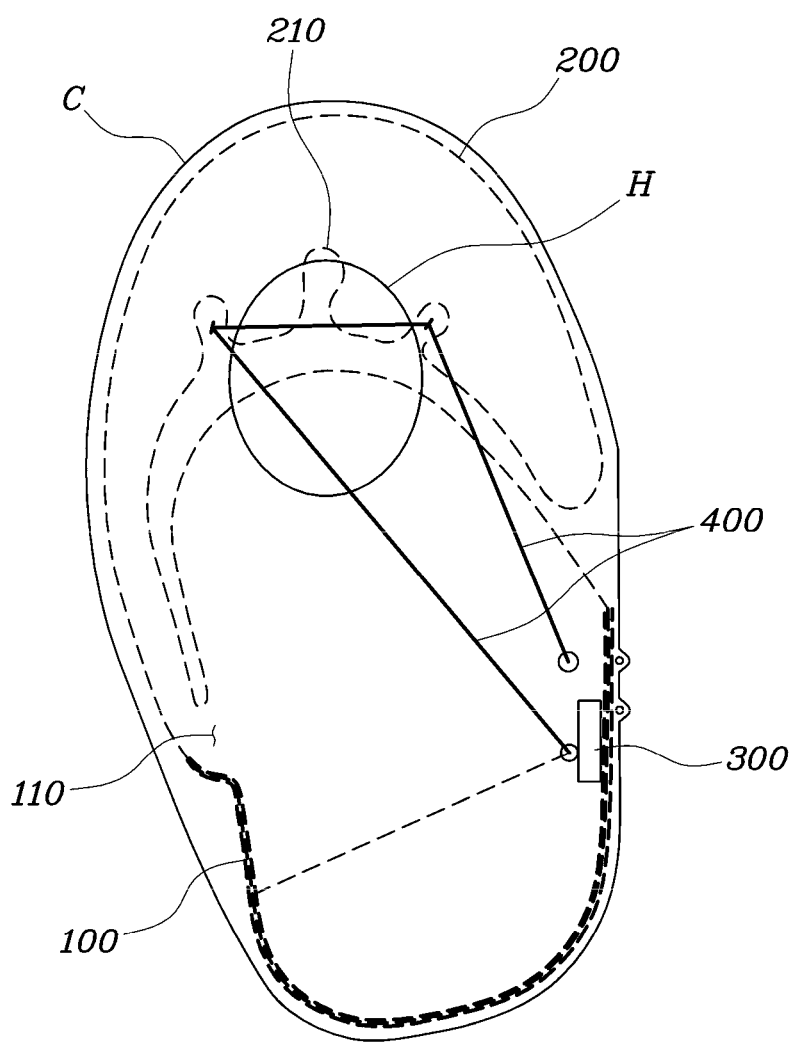
FIG. 4 is a cross-sectional view illustrating a state in which a SAB is deployed according to an exemplary embodiment of the present disclosure.
Figure 5:
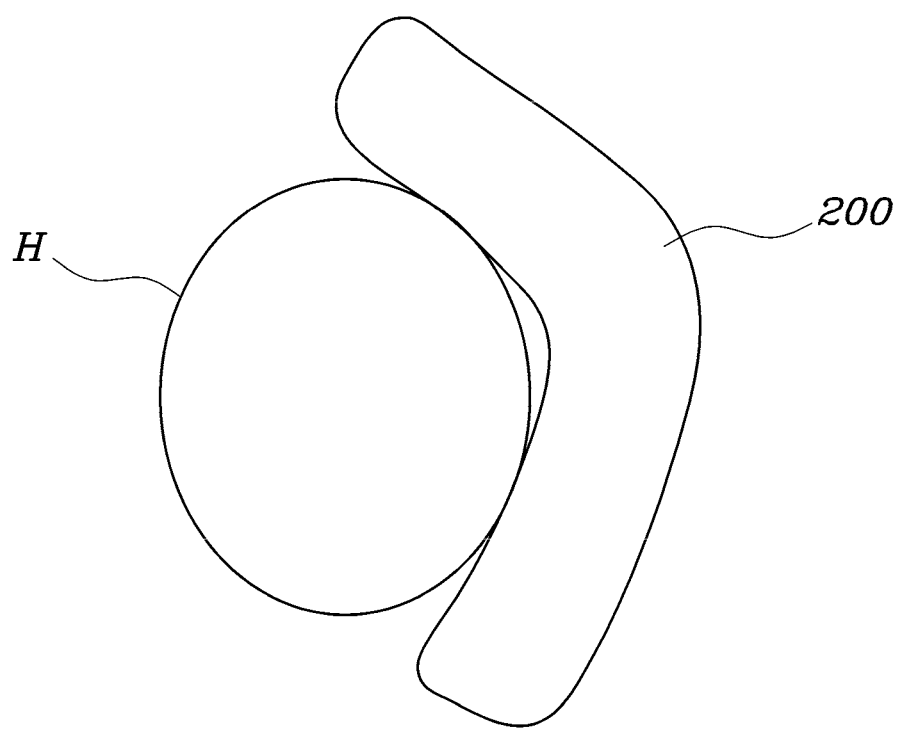
FIG. 5 is a top view illustrating the state in which the SAB is deployed according to an exemplary embodiment of the present disclosure.

FIG. 4 is a cross-sectional view illustrating a state in which a SAB is deployed according to an exemplary embodiment of the present disclosure, and FIG. 5 is a top view illustrating the state in which the SAB is deployed according to an exemplary embodiment of the present disclosure.

Referring to FIGS. 4 to 5, the SAB according to an exemplary embodiment of the present disclosure is provided in a seat to be deployed from a side surface portion thereof and includes a main chamber 100 configured to cover a thoracic region, an abdomen region, or a pelvis region of an occupant at a side surface thereof during deployment, a main inflator 300 configured to supply gas to the main chamber 100 to deploy the main chamber 100, and an auxiliary chamber 200 communicating with the main chamber 100 to allow the gas in the main chamber 100 to be supplied to an interior of the auxiliary chamber 200 and connected to the main chamber 100 to be deployed there above.

The main chamber 100 and the main inflator 300 may be fixedly coupled to the seat of the vehicle, and the auxiliary chamber 200 may be coupled to and communicate with the main chamber 100. The main chamber 100 and the auxiliary chamber 200 may be surrounded by a single cover C.

In order to cover the thoracic region, the abdomen region, or the pelvis region of the occupant at a side surface thereof, the main chamber 100 may be deployed from the side surface portion the seat to cover a side surface of the occupant. As the main inflator 300 fixed to the seat of the vehicle supplies gas to the main chamber 100, the main chamber 100 may be deployed.

The auxiliary chamber 200 may be deployed above the main chamber 100 to cover the head of the occupant. The head of the occupant may be covered by the auxiliary chamber 200 or covered between the main chamber 100 and the auxiliary chamber 200.

Since the gas in the main chamber 100 is supplied to the interior of the auxiliary chamber 200 after the main chamber 100 is deployed by the main inflator 300, a time delay may occur such that the auxiliary chamber 200 is deployed after the main chamber 100 is deployed.

The auxiliary chamber 200 may be communicated with the main chamber 100 through an internal vent hole 110, which is formed at a position spaced apart from a position at which the gas is supplied from the main inflator 300 in the front-rear direction, and deployed with a delay than the deployment of the main chamber 100.

Since the main chamber 100 communicates with the auxiliary chamber 200 through the internal vent hole 110, when the deployment of the main chamber 100 is restricted or interferes with by an arm of the occupant or other obstacle, the gas inside the main chamber 100 may not be leaked to the outside and the auxiliary chamber 200 may be deployed early. Accordingly, it is possible to prevent a problem that the gas inside the main chamber 100 is leaked to the outside through a vent hole.

For example, the main inflator 300 may be located at a rear end portion of the main chamber 100, and the main chamber 100 may be deployed forward from the main inflator 300. The internal vent hole 110 may be located at a front end portion of the main chamber 100, and the auxiliary chamber 200 may be coupled to the front end portion of the main chamber 100 and may have a shape of extending upward and being bent to a rear side.

Thus, since the internal vent hole 110 is located at a position spaced apart from the main inflator 300 located at the rear end portion of the main chamber 100, after the thoracic region, the abdomen region, or the pelvis region of the occupant is covered at the side surface thereof, the auxiliary chamber 200 may be deployed to generate a time delay so as to protect the head of the occupant.

The auxiliary chamber 200 may further include a fixing tether 400 communicated with the main chamber 100 through the internal vent hole 110 located at a front side or a rear side of the main chamber 100, coupled to the auxiliary chamber 200 at a position spaced apart from the internal vent hole 110 in the front-rear direction, and configured to pull the auxiliary chamber 200 to the occupant when the auxiliary chamber 200 is deployed.

For example, the internal vent hole 110 may be located at the front side of the main chamber 100 to discharge the gas inside the main chamber 100, and the auxiliary chamber 200 may be coupled to the front side of the main chamber 100 to extend rearward.

The fixing tether 400 may be coupled to a central portion of the auxiliary chamber 200 to pull the auxiliary chamber 200 to the occupant. The fixing tether 400 may be coupled to a lower end portion of the auxiliary chamber 200 at the central portion thereof.

Thus, before the head of the occupant is loaded laterally, the auxiliary chamber 200 is bent to the head of the occupant so that there is an effect of holding the head of the occupant early.

According to an exemplary embodiment, one end portion of the fixing tether 400 may be fixed to the seat and the other end portion thereof may be coupled to the auxiliary chamber 200. The fixing tether 400 may be coupled to the auxiliary chamber 200 at one point or a plurality of points.

Alternatively, both end portions of the fixing tether 400 may be fixed to the seat, and the fixing tether 400 may be coupled to the auxiliary chamber 200 between the both end portions at a plurality of positions spaced apart from each other in the front-rear direction.

Specifically, in a state in which all the both end portions are fixed to the seat, the fixing tether 400 may be slidably coupled to the auxiliary chamber 200 at the plurality of positions. The plurality of positions may be spaced apart from each other in the front-rear direction.

Thus, as the auxiliary chamber 200 is deployed, a front end portion of the auxiliary chamber 200 is bent to a front side of the head of the occupant, and a rear end portion of the auxiliary chamber 200 is bent to a rear side of the occupant. Consequently, as shown in FIG. 5, there is an effect of surrounding the head of the occupant in the front side and the rear side thereof.

Further, a bending line 210 may be formed to vertically extend from the central portion of the auxiliary chamber 200 and bend the auxiliary chamber 200 to be pursed to the occupant when the auxiliary chamber 200 is opened. That is, the front end portion of the auxiliary chamber 200 may be bent to the front side of the head of the occupant, and the rear end portion of the auxiliary chamber 200 may be bent to the rear side of the occupant.

The bending line 210 may be a seam line and may be formed in the central portion of the auxiliary chamber 200 so as to induce the bending of the auxiliary chamber 200. The bending line 210 may have a shape extending upward below the auxiliary chamber 200 and may be formed as a plurality of bending lines 210. In particular, the bending line 210 may be located between a plurality of positions at which the fixing tether 400 is slidably coupled to the auxiliary chamber 200.

FIG. 6 is a cross-sectional view illustrating a state in which a SAB is deployed according to another exemplary embodiment of the present disclosure.

Referring to FIG. 6, an auxiliary chamber 200 may be coupled to an upper portion of a main chamber 100 to be communicated with the main chamber 100 through an internal passage 120 formed in the upper portion of the main chamber 100.

The auxiliary chamber 200, which is deployed from the upper portion of the main chamber 100, may be coupled to the upper portion of the main chamber 100 and connected to receive gas through the internal passage 120 formed in the upper portion of the main chamber 100.

Specifically, since interference of the internal vent hole 110, which is located so as to not interfere with the arm of the occupant and the like based on a normal posture of the occupant, occurs in a relaxing posture of the occupant, in order to prevent a phenomenon in which a gas flow to the auxiliary chamber 200 is restricted, the internal passage 120 may be formed in the upper portion of the main chamber 100.

When the internal passage 120 is formed, it is possible to omit the internal vent hole 110.

The internal passage 120 may be formed to be spaced apart from a main inflator 300 in the front-rear direction, and a front end portion or a central portion of the internal passage 120 may be directly connected to the auxiliary chamber 200 in the upper portion of the main chamber 100.

The SAB may further include an external tether 500 connected to the auxiliary chamber 200 at a position spaced apart from the internal passage 120 in the front-rear direction and configured to pull the auxiliary chamber 200 downward when the auxiliary chamber 200 is deployed.

The external tether 500 may be located to a rear side of the internal passage 120 and coupled to a rear end portion of the auxiliary chamber 200. One end of the external tether 500 is fixed to the seat, and the other end of the external tether 500 is coupled to the rear end portion of the auxiliary chamber 200 so that the external tether 500 may pull the auxiliary chamber 200 downward from the rear end portion thereof. Accordingly, when the auxiliary chamber 200 is deployed, a position of the auxiliary chamber 200 may be held to the main chamber 100.

The internal passage 120 communicating the main chamber 100 with the auxiliary chamber 200 may be formed in a central portion between the auxiliary chamber 200 and the main chamber 100, and a slit 121 extending to the internal passage 120 to separate the main chamber 100 from the auxiliary chamber 200 may be formed in front of the main chamber 100 and the auxiliary chamber 200.

The internal passage 120 communicating the main chamber 100 with the auxiliary chamber 200 may be formed at a position spaced apart from the front end portions of the main chamber 100 and the auxiliary chamber 200, and the main chamber 100 may be spaced apart from the auxiliary chamber 200 at the front side thereof due to the slit 121. The SAB may further include a cover C for simultaneously surrounding the main chamber 100 and the auxiliary chamber 200, and the slit 121 may be formed in the cover C.

Therefore, when the main chamber 100 and the auxiliary chamber 200 are deployed in a state in which a seat belt is worn, webbing of the seat belt may be inserted into the slit 121, and thus there is an effect that interference with the seat belt is avoided.

FIG. 7 is a cross-sectional view illustrating a state in which a SAB is deployed according to still another exemplary embodiment of the present disclosure, and FIGS. 8A and 8B are diagrams illustrating a variable vent 160 according to an exemplary embodiment of the present disclosure.

Referring to FIGS. 7, 8A, and 8B, a main chamber 100 includes a thoracic chamber 130 located in an upper portion of the main chamber 100 and configured to cover a thoracic region and an abdomen region of an occupant, and a pelvic chamber 140 located in a lower portion of the main chamber 100 and configured to cover a pelvis region of the occupant. The thoracic chamber 130 and the pelvic chamber 140 may be communicated with a main inflator 300.

The thoracic chamber 130 and the pelvic chamber 140 may be partitioned inside the main chamber 100 in a state of being simultaneously communicated with the main inflator 300. Thus, the thoracic chamber 130 and the pelvic chamber 140 may be simultaneously deployed.

The main chamber 100 may further include an augmentation chamber 150 coupled to the pelvic chamber 140 to be communicated therewith through the variable vent 160 and located below the pelvic chamber 140 when the main chamber 100 is deployed. When opened, the variable vent 160 may be communicated such that gas in the pelvic chamber 140 is supplied to the augmentation chamber 150.

When the main chamber 100 is deployed, the augmentation chamber 150 may be coupled to the pelvic chamber 140 to be located therebelow and may be connected to the pelvic chamber 140 through the variable vent 160. Accordingly, in a relaxing posture of an occupant, the augmentation chamber 150 is deployed to extend below the pelvic chamber 140 so that the pelvis region of the occupant may be safely protected.

The variable vent 160 may have a configuration in which a vent hole is varied to allow the variable vent 160 to be opened or closed.

Specifically, the SAB may further include a vent tether 170 connected to the variable vent 160 and configured to, when the pelvic chamber 140 is deployed, close the variable vent 160 by being pulled and open the variable vent 160 by being cut.

When pulled, the vent tether 170 may close the variable vent 160. For example, the vent tether 170 may connected to the variable vent 160 along a periphery of the vent hole to control a size of the vent hole.

As maintained in a state of being pulled, the vent tether 170 may close the variable vent 160, and, when the pelvic chamber 140 is deployed in the relaxing posture of the occupant, the vent tether 170 may be cut to open the variable vent 160. The vent tether 170 may be provided with a tether cutter (not shown) for cutting the vent tether 170 by a controller (not shown) which will described below.

Alternatively, the vent tether 170 may be fixed to a seat or a vehicle body to extend as a reclining angle of the seat is increased and to be pulled as the reclining angle of the seat is decreased.

FIG. 9 is a cross-sectional view illustrating a state in which a SAB is deployed according to yet another exemplary embodiment of the present disclosure.

Referring to FIG. 9, the SAB may further include a central tether 600 coupled to an upper portion of the auxiliary chamber 200 and configured to pull the upper portion of the auxiliary chamber 200 to an occupant when the auxiliary chamber 200 is deployed.

One end of the central tether 600 may be fixed to the seat, and the other end thereof may be coupled to the upper portion of the auxiliary chamber 200. The central tether 600 may be directly coupled to the upper portion of the auxiliary chamber 200 in a central portion thereof, and, when the auxiliary chamber 200 is deployed, the central tether 600 may pull the upper portion of the auxiliary chamber 200 to the occupant.

When the auxiliary chamber 200 is deployed, the central tether 600 may overlap to interfere with a CAB. To avoid the interference, when the auxiliary chamber 200 is deployed, the central tether 600 may pull the auxiliary chamber 200 to the occupant in a direction in which the auxiliary chamber 200 is spaced apart from the CAB.

When the auxiliary chamber 200 is deployed, the central tether 600 may pivot the auxiliary chamber 200 to the occupant and then may be cut. A tether cover, which will be described below, may be provided on the central tether 600, and a tether cutter (not shown) may be controlled by a controller (not shown) to cut the central tether 600 after the deployment of the auxiliary chamber 200 or the CAB.

FIG. 10 is a cross-sectional view illustrating a state in which a SAB is deployed according to still yet another exemplary embodiment of the present disclosure, FIGS. 11A and 11B are diagrams illustrating deployment states of a main chamber 100 and an auxiliary chamber 200 according to whether a limiting tether 800 is cut, and FIG. 12 is a flowchart of a controller (not shown) according to an exemplary embodiment of the present disclosure.

Referring to FIGS. 10, 11A, 11B, and 12, the SAB may further include an auxiliary inflator 700 configured to supply gas to the auxiliary chamber 200 to deploy the auxiliary chamber 200.

The auxiliary inflator 700 may be separately configured from a main inflator 300 and may directly supply gas to the auxiliary chamber 200. The auxiliary inflator 700 may be controlled to supply gas to the auxiliary chamber 200 in preference to a supply of gas to the main inflator 300 to deploy the auxiliary chamber 200 in advance.

The SAB may further include the limiting tether 800 coupled to an upper portion of the auxiliary chamber 200 and configured to pull the upper portion of the auxiliary chamber 200 downward so as to limit the deployment of the auxiliary chamber 200 above the main chamber 100, and a tether cutter (not shown) configured to cut the limiting tether 800 during an operation of the SAB.

One end of the limiting tether 800 may be fixed to the seat, and the other end thereof may be coupled to the upper portion of the auxiliary chamber 200. Even when the auxiliary chamber 200 is deployed, the limiting tether 800 may hold the auxiliary chamber 200 so as to not be located above the main chamber 100. That is, the limiting tether 800 may hold the upper portion of the auxiliary chamber 200 so as to be located on an outer surface or an inner surface of the main chamber 100.

As shown in FIG. 10, when an auxiliary chamber 200' is held by a limiting tether 800', an upper portion of the auxiliary chamber 200' may be held toward downward in a state of being pivoted.

However, when the limiting tether 800 is cut by the tether cutter (not shown), the auxiliary chamber 200 may be pivoted and thus the upper portion thereof is directed to face upward so that the limiting tether 800 may be located above the main chamber 100.

As shown in FIG. 11A, when the auxiliary chamber 200 is held by the limiting tether 800, the auxiliary chamber 200 may be located on the outer surface of the main chamber 100 to reinforce a thickness of the main chamber 100. In particular, when an occupant is in a normal posture, the auxiliary chamber 200 may be held by the limiting tether 800 so as to avoid interference with a CAB and may cover a body B of the occupant together with the main chamber 100.

As shown in FIG. 11B, when the limiting tether 800 is cut, the auxiliary chamber 200 may be released from the holding due to the limiting tether 800 and located above the main chamber 100. In particular, when the occupant is in a relaxing posture, the auxiliary chamber 200 may extend above the main chamber 100 so as to protect a head H of the occupant. Thus, as the holding due to the limiting tether 800 is released, the auxiliary chamber 200 may extend upward from the main chamber 100 covering the body B of the occupant to cover the head H of the occupant.

The SAB may further include a controller (not shown) configured to control the auxiliary inflator 700 to supply gas to the auxiliary chamber 200 when a side collision of a vehicle is expected and control the main inflator 300 to supply gas to the main chamber 100 when the side collision of the vehicle occurs.

Specifically, the controller (not shown) may receive a reclining angle of the seat. The controller (not shown) may be connected to a separate sensor or a separate seat recliner to determine whether a pivoted angle of a seat back exceeds a predetermined angle (S100). For example, the predetermined angle may be set to 40 degrees based on a vertical direction.

The controller (not shown) may detect a case in which the vehicle is approaching in a collisionable direction and at a speed from a side of the vehicle to predict a side collision of the vehicle (S200). In particular, the controller (not shown) may predict a collision state of the vehicle through sensors such as a camera, a radar, and the like and control the auxiliary inflator 700 (a pre-crash function).

When the controller (not shown) predicts the side collision of the vehicle, the controller (not shown) may operate the auxiliary inflator 700 before the side collision of the vehicle to supply gas to the auxiliary chamber 200 (S400).

When the auxiliary inflator 700 supplies the gas to the auxiliary chamber 200, the controller (not shown) may operate the tether cutter (not shown) to cut the limiting tether 800 when the reclining angle of the seat is greater than or equal to the predetermined angle (S300) before the auxiliary inflator 700 supplies the gas to the auxiliary chamber 200 (S400).

The tether cutter (not shown) may be operated by a separately formed cutter inflator which is controlled to expand by the controller (not shown).

The controller (not shown) may detect the side collision of the vehicle (S500). When the side collision of the vehicle occurs, the controller (not shown) may control the main inflator 300 to supply the gas to the main chamber 100 (S600).

Therefore, there is an effect which is capable of deploying the auxiliary chamber 200 by detecting the side collision of the vehicle in advance and controlling a position of the auxiliary chamber 200 according to the reclining angle of the seat. Consequently, there is an effect which is capable of safely protecting the occupant while avoiding interference with the CAB.

In accordance with a side airbag (SAB) of a vehicle according to the present disclosure, a head of an occupant can be protected in a relaxing mode of a seat without increasing a capacity of an inflator to obtain an effect which is capable of perfectly protecting the occupant.

Although specific embodiments of the present disclosure has been described and illustrated, those skilled in the art will appreciate that various alternations and modifications are possible without departing from the technical spirit of the present disclosure as disclosed in the appended claims.

What is claimed is:

1. A side airbag (SAB) of a vehicle, comprising:
   a main chamber disposed in a seat to be deployed from a side surface portion of the seat, wherein the main chamber is configured to, when deployed, cover at least one of a thoracic region, an abdomen region, or a pelvis region of an occupant;
   a main inflator configured to supply gas to the main chamber to deploy the main chamber; and
   an auxiliary chamber communicating with the main chamber to allow the gas inside the main chamber to be supplied to an interior of the auxiliary chamber and connected to the main chamber to be deploy above the main chamber,
   wherein the main chamber includes:
      a thoracic chamber located in an upper portion of the main chamber and configured to cover the thoracic region and the abdomen region of the occupant and
      a pelvic chamber located in a lower portion of the main chamber and configured to cover the pelvis region of the occupant,
      wherein the thoracic chamber and the pelvic chamber communicate with the main inflator,
   the SAB further comprises an augmentation chamber coupled to the pelvic chamber to communicate with the pelvic chamber through a variable vent, the augmentation chamber located below the pelvic chamber when the SAB is deployed,
   wherein the variable vent is configured to allow gas inside the pelvic chamber to be supplied to the augmentation chamber when the variable vent is opened, and
   wherein the SAB further comprises a vent tether connected to the variable vent and configured to, when the pelvic chamber is deployed, close the variable vent as being pulled or open the variable vent as being cut.

2. The SAB of claim 1, wherein the auxiliary chamber communicates with the main chamber through an internal vent hole defined at a first position spaced apart from a second position, at which the gas is supplied from the main inflator, in a front-rear direction and is deployed with a delay than the deployment of the main chamber.

3. The SAB of claim 1, wherein the auxiliary chamber communicates with the main chamber through an internal vent hole located at a front side of the main chamber, and
   wherein the SAB further includes a fixing tether coupled to the auxiliary chamber at a position spaced apart from an internal vent hole in a front-rear direction and configured to pull the auxiliary chamber to the occupant when the auxiliary chamber is deployed.

4. The SAB of claim 3, wherein both end portions of the fixing tether are fixed to the seat, and the fixing tether is coupled to the auxiliary chamber at a plurality of positions spaced apart from each other between the both end portions in the front-rear direction.

5. The SAB of claim 1, wherein a bending line extends vertically in a central portion of the auxiliary chamber and bends the auxiliary chamber to be pursed to the occupant when the auxiliary chamber is deployed.

6. The SAB of claim 1, wherein the auxiliary chamber is coupled to the upper portion of the main chamber to communicate with the main chamber through an internal passage defined in the upper portion of the main chamber.

7. The SAB of claim 6, further comprising an external tether connected to the auxiliary chamber at a position spaced apart from the internal passage in the front-rear direction and configured to pull the auxiliary chamber downward when the auxiliary chamber is deployed.

8. The SAB of claim 6, wherein the internal passage configured to connect the main chamber to the auxiliary chamber is defined in a central portion between the auxiliary chamber and the main chamber, and
   wherein the SAB further comprises a slit extending toward the internal passage to separate the main chamber from the auxiliary chamber in front of the main chamber and auxiliary chamber.

9. The SAB of claim 1, further comprising a central tether coupled to an upper portion of the auxiliary chamber and configured to pull the upper portion of the auxiliary chamber to the occupant when the auxiliary chamber is deployed.

10. The SAB of claim 1, further comprising an auxiliary inflator configured to supply gas to the auxiliary chamber to deploy the auxiliary chamber.

11. The SAB of claim 10, further comprising:
    a limiting tether coupled to an upper portion of the auxiliary chamber and configured to pull the upper portion of the auxiliary chamber downward so as to limit deployment of the auxiliary chamber above the main chamber.

12. The SAB of claim 10, further comprising a controller configured to:
    control the auxiliary inflator to supply gas to the auxiliary chamber when a side collision of a vehicle is expected, and
    control the main inflator to supply gas to the main chamber when the side collision of the vehicle occurs.

13. The SAB of claim 11, further comprising a controller configured to operate a tether cutter to cut the limiting tether when the auxiliary inflator supplies gas to the auxiliary chamber and a reclining angle of the seat is greater than or equal to a predetermined angle.

* * * * *